F. G. Wilson,
Belt Fastener,

Nº 84,925.          Patented Dec. 15, 1868.

Witnesses:
B. B. Whittum
Ira Cone

Inventor:
Francis Greenleaf Wilson

UNITED STATES PATENT OFFICE.

F. GREENLEAF WILSON, OF NASHUA, NEW HAMPSHIRE.

IMPROVED BELT-FASTENER.

Specification forming part of Letters Patent No. 84,925, dated December 15, 1868.

*To all whom it may concern:*

Be it known that I, F. GREENLEAF WILSON, of the city of Nashua, county of Hillsborough, State of New Hampshire, have invented a new and Improved Method of Connecting, Fastening, or Joining Belts or the Ends of Belts; and I do declare the following to be a full, clear, and exact description of the same, reference being had to the accompanying drawings, and the letters of reference marked thereon.

Figure 2:
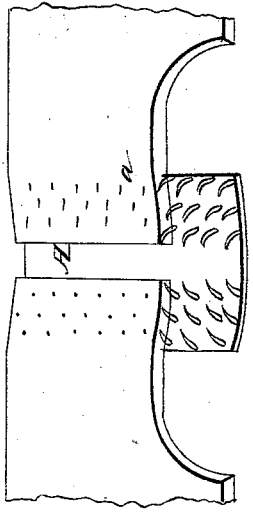
Figure 1:
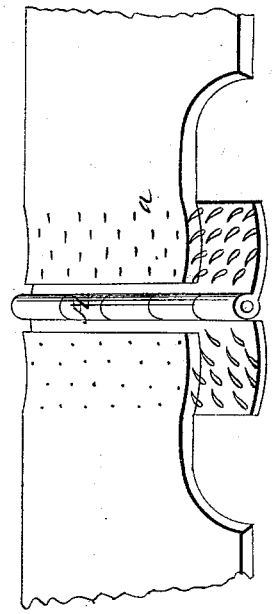

In Figures 1 and 2, A represents the fastener with the ends of the belt attached. The lower corners of the belt are shown as cut out, to show the teeth, hooks, or spurs in the fastener.

The fastener is made without a joint, as in Fig. 2, or with a joint, like a common door-hinge, as in Fig. 1, with teeth, hooks, or spurs projecting from the inside, the said teeth or spurs to be crooked or curved, like a cat's claw, the teeth on each side inclining toward each other.

The teeth 2 2 2, &c., may be made a little shorter than the thickness of the belt, so as not to go quite through, or they may be made long enough to go through and the points turned down or clinched, as shown on the right side of each, marked *a a*.

Each side of the hinged fastener is bent or curved to the same curve as the circumference of the smallest pulley over which the belt passes. This will insure the belt always pressing against the edge of the fastener, and prevent the teeth or hooks from working into and out of the belt while passing over the pulleys, which it would do if the sides were straight, as in a common door-hinge.

Where the pulleys are large the fastener may be made in a single piece without a joint, as in Fig. 2, the fastener being curved, same as the circumference of the smallest pulley, for same reasons as the first.

To apply the fastener, lay the ends of the belt on a pulley or piece of wood, and, with a hammer or mallet, drive on the back of fastener, forcing the teeth or hooks into the belt.

Claim.

What I claim as my invention, and wish to secure by Letters Patent, is—

A single-plate belt-hook with one or more rows of teeth, spurs, or pins on or near the edges of the concave side of the plate, as shown and described.

F. GREENLEAF WILSON.

Witnesses:
 B. B. WHITTEMORE,
 IRA COUCH.